United States Patent [19]

Tanabashi

[11] 4,162,285
[45] Jul. 24, 1979

[54] METHOD FOR PRODUCING A CERAMIC HONEYCOMB STRUCTURE HAVING NO CRACKS

[75] Inventor: Isao Tanabashi, Nagoya, Japan
[73] Assignee: NGK Insulators, Ltd., Nagoya, Japan
[21] Appl. No.: 804,160
[22] Filed: Jun. 6, 1977
[30] Foreign Application Priority Data
  Jun. 10, 1976 [JP] Japan ................................. 51-67058
[51] Int. Cl.² ........................................... C04B 33/32
[52] U.S. Cl. ..................................... 264/66; 264/209
[58] Field of Search ..................... 264/63, 209, 66, 56
[56] References Cited
  U.S. PATENT DOCUMENTS
  3,434,912  3/1969  Peri ....................................... 264/63
  4,018,858  4/1977  Walters et al. ...................... 264/63
  4,054,702  10/1977 Lundsojer et al. ................. 264/56

FOREIGN PATENT DOCUMENTS
  1373816  11/1974  United Kingdom ..................... 264/63

Primary Examiner—Donald J. Arnold
Assistant Examiner—John A. Parrish
Attorney, Agent, or Firm—Stevens, Davis, Miller & Mosher

[57] ABSTRACT

A ceramic honeycomb structure having no cracks is produced by adding water and a polyhydric alcohol to ceramic starting material powder, shaping the resulting mixture into a honeycomb structure, drying the shaped honeycomb structure at a temperature which evaporates water but does not evaporate the polyhydric alcohol, to evaporate the water then, heating the honeycomb structure at a temperature which evaporates the polyhydric alcohol, to evaporate the polyhydric alcohol, and then firing the honeycomb structure.

7 Claims, No Drawings

METHOD FOR PRODUCING A CERAMIC HONEYCOMB STRUCTURE HAVING NO CRACKS

The present invention relates to a method for producing a ceramic honeycomb structure.

In the remainder of the specification, the term "honeycomb structure" shall be understood to mean a structure having a multiplicity of parallel channels extending therethrough with each of said channels being bounded by thin partition walls.

Recently, ceramic honeycomb structures have received attention as catalyst substrates for purifying exhaust gases, as cores for heat exchangers used at high temperatures and the like, and have been widely used. One of the processes for producing ceramic honeycomb structures is an extrusion process.

The extrusion process is one for generally producing ceramic products by extrusion, in which a green mass obtained by adding an organic binder and an appropriate amount of water to various ceramic powders and kneading the mixture is extruded. The extruded green structure is then dried by conventional means and the dried structure is fired. However, it is very difficult to produce a ceramic honeycomb structure having a multiplicity of parallel channels extending therethrough with each of said channels being bounded by thin partition walls by the same process as the process for producing general ceramic products. Particularly, when a honeycomb structure of large size is extruded and then dried, uniform drying is difficult and when a difference in the drying rate occurs on the portions of the structure, a difference occurs in drying shrinkage. As a result breakage is very apt to occur and the yield becomes very poor.

The method for producing a ceramic honeycomb structure according to the present invention has obviated the above drawbacks and can produce a ceramic honeycomb structure in high yield irrespective of its size and shape.

The method of the present invention comprises adding water and a polyhydric alcohol in a ratio by weight of water to the polyhydric alcohol of 85:15-5:95, preferably 80:20-14:86, more particularly 65:35-25:75, (adding if necessary, an organic binder) to the ceramic starting material powder, kneading the mixture, shaping the kneaded mixture into a honeycomb structure, drying the structure at a temperature at which water is evaporated but the polyhydric alcohol is not substantially evaporated to evaporate and remove a major part of the contained water, then heating the structure at a temperature at which the polhydric alcohol is evaporated, to evaporate and remove the polhydric alcohol, and thereafter firing the structure.

The method for producing the ceramic honeycomb structure according to the present invention will be explained in more detail with respect to the case where the shaping step is conducted by an extrusion process.

As for the composition of ceramics for ceramic honeycomb structure, use may be made of a mixture of at least one of cordierite, mullite, alumina, zircon, silicon nitride or ceramic starting materials which form these ceramic compositions on firing. To these ceramic starting materials is added an aqueous solution obtained from water and a polyhydric alcohol, such as glycerine, ethylene glycol, propylene glycol, diethylene glycol, butylene glycol, triethylene glycol and the like in a mixture ratio by weight of 85:15-5:95, preferably 80:20-14:86, more particularly 65:35-25:75, said mixture ratio being properly selected depending upon the kind of ceramic starting material powder, its particle size, the condition of extruding and the like. If necessary, an organic binder, such as methyl cellulose, polyvinyl alcohol, starch and the like is added thereto, preferably in an amount of less than 10% by weight. The resulting mixture is thoroughly kneaded by means of a kneader to prepare an extrudable green mass. In this case, water and the polyhydric alcohol may be separately added in the required ratio of water to the polyhydric alcohol. A preferable amount of polyhydric alcohol is 5-45 parts by weight based on 100 parts by weight of the ceramic starting material powder.

A die for extruding the honeycomb structure having the desired shape is one in which the cross-sectional shape of the channels is circular, oval or polygonal, such as triangular, tetragonal, hexagonal and the like. The die is provided preferably at the outlet of a vacuum extruder to extrude the ceramic honeycomb structure. The extruded structure is dried at a temperature at which water is evaporated, but the added polyhydric alcohol is not substantially evaporated, to evaporate and remove uniformly a major part of the water contained in the shaped structure. Uniform evaporation of the water is achieved owing to the function of the polyhydric alcohol which adjusts humidity. The structure is then heated at a temperature at which the polyhydric alcohol is evaporated, (which is, in general a temperature at which the vapor pressure is lower than the boiling point), to evaporate and remove a major part of the polyhydric alcohol. The dried structure is then fired by a conventional firing process.

There is a correlation between the concentration of the polyhydric alcohol contained in the honeycomb structure and the relative humidity of atmosphere in the vicinity of the surface of the honeycomb structure, such that the higher the concentration of the polyhydric alcohol, the lower the relative humidity is. For example, the relative humidity of atmosphere at the surface of aqueous glycerine solutions having the following concentrations at 25° C. is as follows.

| Concentration of glycerine | Relative humidity |
| --- | --- |
| 15% | 98% |
| 25% | 92.8% |
| 50% | 73.4% |
| 75% | 44.3% |
| 98% | 1.7% |

Accordingly, when the polyhydric alcohol and water are contained in the green ceramic honeycomb structure, if it is assumed that in the drying step, for example, there are formed in the extruded structure portions where the drying degree is not uniform (in reality, according to the present invention, such portions are not formed), that is the portions where drying proceeds and the water content is smaller (in these portions, the concentration of the polyhydric alcohol becomes high) and portions where drying is delayed and the water content is larger (in these portions, the concentration of the polyhydric alcohol becomes low). In the portions where the concentration of the polyhydric alcohol is higher, the relative humidity of atmosphere in the vicinity of the surface of the honeycomb is lower, that is the vapor partial pressure of water is lower, while in the portions where the concentration of the polyhydric alcohol is lower, the relative humidity in the vicinity of the surface of the honeycomb structure is higher, that is the vapor partial pressure of water is higher. In this state, for example, when air at a temperature at which the polyhydric alcohol is not substantially evaporated passes through the channels of the green honeycomb structure, drying at the portion where drying is delayed and the vapor partial pressure of water is higher progresses more and the vaporizing rate of water is greater than at the portion where the vapor partial pressure of water is lower and as a result, balanced uniform drying can be effected in both portions.

That is, when the green ceramic honeycomb structure contains water and polyhydric alcohol, the evaporation of water and drying are carried out by the adjustment of humidity in the vicinity of the surface of the green honeycomb structure and uniform drying can be effected without causing the breaking stress on the structure by promoting local drying.

It has been generally known that when the ceramic green mass is dried, shrinkage due to drying occurs at the original stage of the drying and in a complicated structure having thin walls, such as a honeycomb structure, the crack breakage is readily caused due to the drying shrinkage, so that it is the essential requirement for obtaining a sound ceramic honeycomb structure that particularly uniform drying is effected. The present invention is based on the discovery that uniform drying can be effected by utilizing the humidity-adjusting function of the mixed liquid of polyhydric alcohol and water at the original stage of the drying.

When air having a given temperature is forced through the channels of the ceramic honeycomb structure, it has the effect of increasing the evaporation rate. The evaporated polyhydric alcohol is recovered by cooling to prevent the diffusion of said alcohol into the atmosphere, and the recovered alcohol can be reused.

As the polyhydric alcohol, glycerine and glycols are the most preferable, but when the mixture ratio by weight of the polyhydric alcohol to water is less than 15:85, the humidity-adjusting effect is poor and when the water is evaporated, crack breakage is liable to be caused. On the other hand, when the mixture ratio of polyhydric alcohol to water is more than 95:5, when the polyhydric alcohol is evaporated (after the water is evaporated), shrinkage of the green structure occurs which is locally uneven and crack breakage of the structure occurs, so that the mixture ratio by weight of water to the polyhydric alcohol must be 85:15-5:95. Furthermore, in this case, 80:20-14:86 is preferable and 65:35-25:75 is more preferable.

The following examples are given for the purpose of illustration of this invention and are not intended as limitations thereof.

Ceramic powder, polyhydric alcohols, water and organic binders disclosed in the following table were mixed and kneaded and the resulting green masses were extruded into the honeycomb-shaped structures having the dimensions as described in the following table by a vacuum extruder and water and the polyhydric alcohol were removed respectively under the evaporating conditions described in the following table to obtain the honeycomb structures. The resulting structures were heated at the temperature for firing the respective ceramics for 3 hours. The status of formation of ceramics in these ceramic honeycomb structures is described in the following table. Furthermore, comparative examples produced by the production method beyond the limitation range of the present invention and the conventional products obtained by the heretofore known extrusion process are together shown in the following table.

TABLE

| | | Polyhydric alcohol | | | Organic binder | | Dimension and shape of honeycomb structure | | | | Evaporating condition | | | Status of formation of cracks |
|---|---|---|---|---|---|---|---|---|---|---|---|---|---|---|
| | Ceramics | Kind | Addition amount based on 100 parts by weight of ceramic material | Mixture ratio (water/polyhydric alcohol) | Kind | Amount (part by weight) | Diameter (mm) | Length (mm) | Wall thickness (mm) | Shape and dimension of channel (mm) | water (°C. × hr) | Polyhydric alcohol (°C. × hr) | Air* passing condition (m/sec) | |
| 1 | Cordierite | Glycerine | 6 | 80/20 | Methyl cellulose | 4.5 | 120 | 150 | 0.3 | one side:1.5 tetragon | 25 × 1 | 130 × 2 | 1.5 | not |
| 2 | Cordierite | Glycerine | 12.5 | 60/40 | Methyl cellulose | 4.5 | 120 | 150 | 0.3 | one side:1.5 tetragon | 25 × 1 | 130 × 2 | 1.5 | not |
| 3 | Cordierite | Glycerine | 19.5 | 40/60 | Methyl cellulose | 4.5 | 120 | 150 | 0.3 | one side:1.5 tetragon | 25 × ½ | 130 × 3 | 1.5 | not |
| 4 | Cordierite | Glycerine | 26.9 | 20/80 | Methyl cellulose | 4.5 | 120 | 150 | 0.3 | one side:1.5 tetragon | 25 × ½ | 130 × 3 | 1.5 | not |
| 5 | Cordierite | Ethylene glycol | 18 | 40/60 | Starch size | 3.5 (solid matter) | 96 | 90 | 0.6 | one side:1.7 hexagon | 20 × ½ | 90 × 1 | 2 | not |
| 6 | Cordierite | Propylene glycol | 16.5 | 45/55 | Starch size | 3.5 (solid matter) | 96 | 90 | 0.6 | one side:1.7 hexagon | 20 × ½ | 90 × 1 | 2 | not |
| 7 | Mullite | Ethylene glycol | 27 | 10/90 | Methyl cellulose | 3 | 96 | 90 | 0.6 | one side:1.7 hexagon | 25 × ½ | 90 × 2 | 2 | not |
| 8 | Alumina | Glycerine | 8.6 | 35/65 | Methyl cellulose | 3 | 96 | 90 | 0.6 | one side:1.7 hexagon | 25 × ½ | 130 × 2 | 2 | not |
| 9 | Zircon | Glycerine | 8 | 60/40 | Methyl cellulose | 3 | 96 | 90 | 0.6 | one side:1.7 hexagon | 25 × ½ | 130 × 2 | 2 | not |
| 10 | Silicon nitride | Glycerine | 6 | 80/20 | Methyl cellulose | 3 | 96 | 90 | 0.6 | one side:1.7 hexagon | 25 × ½ | 130 × 1 | 2 | not |
| 11 | Cordierite | Diethylene glycol | 18 | 35/65 | Methyl cellulose | 3 | 96 | 90 | 0.6 | one side:1.7 hexagon | 25 × ½ | 120 × 2 | 2 | not |
| 12 | Cordierite | Butylene glycol | 16.5 | 40/60 | Methyl cellulose | 3 | 96 | 90 | 0.6 | one side:1.7 hexagon | 25 × ½ | 100 × 2 | 2 | not |
| 13 | Cordierite | Triethylene glycol | 18 | 35/65 | Methyl cellulose | 3 | 96 | 90 | 0.6 | one side:1.7 hexagon | 25 × ½ | 130 × 2 | 2 | not |
| 14 | Cordierite | Glycerine | 19.5 | 40/60 | Polyvinyl alcohol | 3 | 96 | 90 | 0.6 | one side:1.7 hexagon | 25 × ½ | 130 × 2 | 2 | not |
| 15 | Cordierite | Glycerine | 3 | 90/10 | Methyl cellulose | 4.5 | 120 | 150 | 0.3 | one side:1.5 tetragon | 25 × ½ | 130 × 1 | 1.5 | cause |
| 16 | Cordierite | Glycerine | 35.8 | 3/97 | Methyl cellulose | 4.5 | 120 | 150 | 0.3 | one side:1.5 tetragon | 25 × ½ | 130 × 4 | 1.5 | cause |
| 17 | Cordierite | Glycerine | 19.5 | 40/60 | Methyl cellulose | 4.5 | 120 | 150 | 0.3 | one side:1.5 tetragon | 110 × ½ | | 1.5 | cause |
| 18 | Cordierite | Glycerine | 19.5 | 40/60 | Methyl cellulose | 4.5 | 120 | 150 | 0.3 | one side:1.5 tetragon | 140 × 2 | | 1.5 | cause |
| 19 | Cordierite | | | | Methyl cellulose | 3 | 96 | 90 | 0.6 | one side:1.7 hexagon | 25 × 2 | | 2 | cause |
| 20 | Cordierite | | | | Methyl cellulose | 3 | 96 | 90 | 0.6 | one side:1.7 hexagon | 50 × 1 | | 2 | cause |
| 21 | Cordierite | | | | Starch size | 3.5 (solid matter) | 96 | 90 | 0.6 | one side:1.7 hexagon | 120 × 1 | | 2 | cause |

Rows 1–14: Present invention; Rows 15–18: Comparative example; Rows 19–21: Conventional process.

*The same air passing condition was adopted for drying water and for drying the polyhydric alcohol.

As seen from the above described examples, according to the present invention, the ceramic honeycomb structures having thin partition walls and various dimensions can be produced without causing crack breakage by adding a given amount of water and the polyhydric alcohol to ceramic starting material powder, shaping the resulting green mass into the honeycomb structure, drying the water and the polyhydric alcohol from the structure separately, that is, firstly uniformly evaporating and removing the major part of water by the humidity-adjusting function of the polyhydric alcohol and then evaporating and removing the polyhydric alcohol, and thereafter firing the dried honeycomb structure. The resulting ceramic honeycomb structure is capable of being used as a catalyst substrate for purifying various exhaust gases, as a core for a heat exchanger, and the like, and can be produced economically in high yield. The present invention is a commercially very useful method for producing the ceramic honeycomb structure.

What is claimed is:

1. A method of producing a crack-free ceramic honeycomb structure having a multiplicity of parallel channels extending therethrough, which comprises;

compounding ceramic starting material powders, adding a composition of water and a polyhydric alcohol in a mixture ratio by weight of 85:15-5:95 to the ceramic powders and kneading the resulting mixture, shaping the mixture into a honeycomb structure by extrusion, drying the shaped honeycomb structure at a temperature which evaporates water but does not evaporate the polyhydric alcohol to evaporate water by passing air through the channels of the honeycomb structure, wherein the polyhydric alcohol adjusts the humidity to achieve uniform drying and to alleviate cracking in the drying of the honeycomb structure, heating the honeycomb structure at a temperature which evaporates the polyhydric alcohol to evaporate the polyhydric alcohol, and then firing the honeycomb structure.

2. The method as claimed in claim 1, wherein the polyhydric alcohol is at least one selected from the group consisting of glycerine and glycols.

3. The method as claimed in claim 2, wherein the polyhydric alcohol is glycerine.

4. The method as claimed in claim 2, wherein the glycols are at least one selected from the group consisting of ethylene glycol, propylene glycol, diethylene glycol, butylene glycol and triethylene glycol.

5. The method as claimed in claim 1, wherein the weight ratio of water to the polyhydric alcohol is 80:20-14:86.

6. The method as claimed in claim 5, wherein the weight ratio of water to polyhydric alcohol is 65:35-25:75.

7. A method as in claim 1, wherein said composition consists essentially of water and a polyhydric alcohol.

* * * * *